Jan. 3, 1933.   H. AUSTIN   1,893,350
MOTOR VEHICLE BODY HAVING COLLAPSIBLE HEAD
Filed July 29, 1930   2 Sheets-Sheet 1

Jan. 3, 1933.    H. AUSTIN    1,893,350
MOTOR VEHICLE BODY HAVING COLLAPSIBLE HEAD
Filed July 29, 1930    2 Sheets-Sheet 2
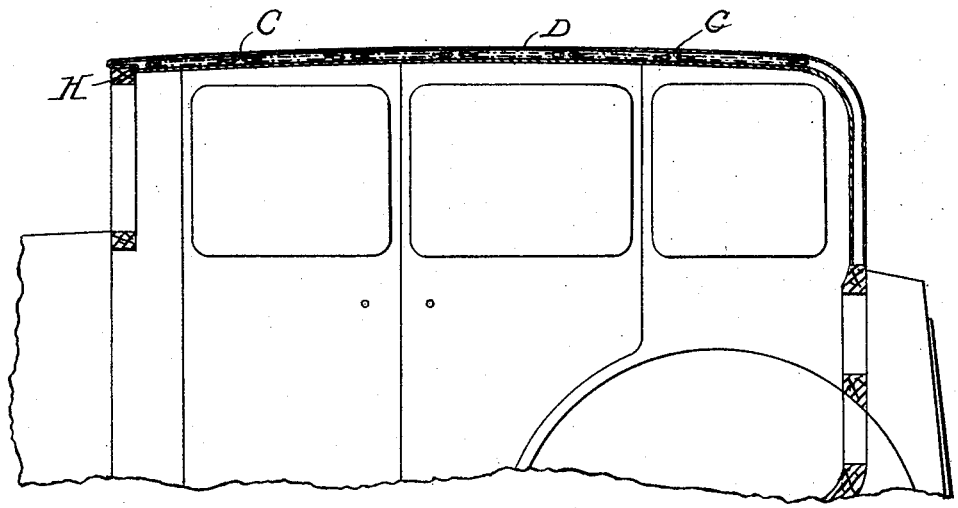

Patented Jan. 3, 1933

1,893,350

UNITED STATES PATENT OFFICE

HERBERT AUSTIN, OF BROMSGROVE, ENGLAND

MOTOR VEHICLE BODY HAVING COLLAPSIBLE HEAD

Application filed July 28, 1930, Serial No. 471,464, and in Great Britain August 3, 1929.

This invention relates to a motor vehicle body of the type having what is known as a "sunshine roof" that is to say a flexible roof in the form of a cover usually of fabric which is folded back leaving fixed cant rails at each side extending over the doors and windows and extending usually down at the rear to a fixed lower portion of the back of the vehicle. In such type of vehicle, hoop sticks or transverse roof members have been attached to the inner surface of the flexible cover and have been arranged to slide in guides of the cant rails, the arrangement having been such that alternate transverse members are guided in guides for the whole of the way back and down to the top of the fixed part of the back of the vehicle while the rest of the transverse members have come free from such guides when they have reached the rear of the top of the vehicle, so that the cover may go into suitable folds.

The object of the present invention is to provide efficient means for obtaining a good weather-proof joint at the front and side edges of the roof fabric.

According to one feature of the invention a strip of rubber or other resilient material is secured upon or in relation to the top surface of each cant rail and extends inwards over the respective edge of the cover bearing downwards at its inner edge against such cover with light elastic force sufficient to afford a weather joint but not enough to impede unduly the movement of the cover endwise. The resilient strip may taper towards its inner edge where it bears upon the fabric.

According to another feature of the invention a similar resilient strip is secured upon, or in relation to, the front cross rail extending at its rear edge over the front edge of the roof fabric when the latter is fully forward. In order to allow the edge of the roof fabric to pass under the rear edge of the resilient strip (hereinafter called the horizontal strip) the latter is held up (when the roof is back) by a second resilient strip set up edgewise and hereinafter called the vertical strip. This latter yields back to the forward edge of the roof fabric allowing the horizontal strip to come down on to the top surface of the fabric, while the vertical strip then bears up against the under surface. A channel to collect water may, however, be arranged in the top surface of the cross rail just beneath the most forward position of the front edge of the roof fabric and the vertical strip may be arranged just at the rear of such channel or form the rear wall thereof.

A channel may also be arranged in the top surface of each cant rail in position under the respective side edge of the fabric and the said side edge may be provided with a bead extending down into the channel, whereby any water which may pass the resilient strip will be directed to the channel and led away.

The invention is described with reference to the drawing herewith, of which:—

Fig. 4 is a longitudinal, vertical section showing a vehicle body having fixed cant rails and transverse members slidable relatively to said rails.

Figure 1:
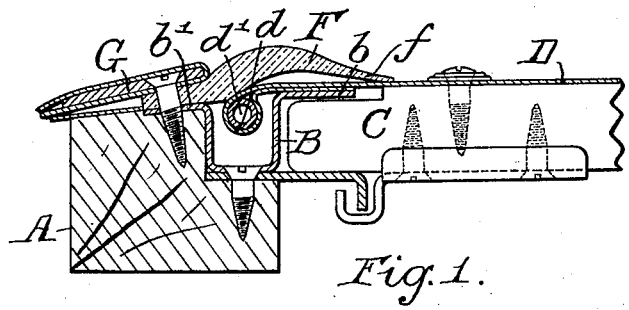
Figure 1 is a cross section through a cant rail of a vehicle constructed according to the invention.

Referring first to Figure 1, A is the cant rail to which is secured a channel B which has an inward flange $b$ passing over the ends of the transverse roof members C. It has also an outwardly extending flange $b'$ screwed to the top of the cant rail A. The channel is also screwed to the cant rail by wood screws passing through the base. D is the roof fabric curled under at the edge and enclosing a coil spring $d'$ thus to form a bead $d$ extending downwardly into the channel. F is a rubber strip secured towards its outer edge to the upper surface of the cant rail, being clamped thereto by a metal strip G. The rubber strip F is bowed up somewhat at its middle portion and thickened to give it strength to exert sufficient downward pressure on the roof fabric at its inner edge, but the strip is tapered down to such edge, as shown at $f$ to accomodate it to the roof contour. This edge, by its resiliency, provides an effective seal against the weather, but if any water should enter, it drips from the bead $d$ into the channel and is conducted away.

Figure 2:
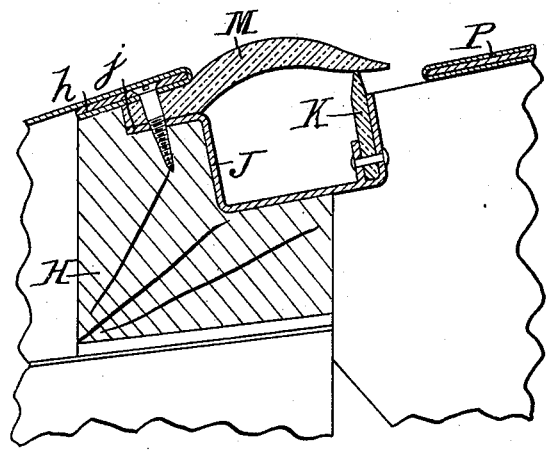
Figure 2 is a cross section of the front cross rail with the strips in the position they assume before the front edge of the roof fabric engages; and, Figure 3 is a view corresponding to Figure 2; but showing the strips in the position they assume after the front edge of the roof fabric has engaged.
Figure 3:
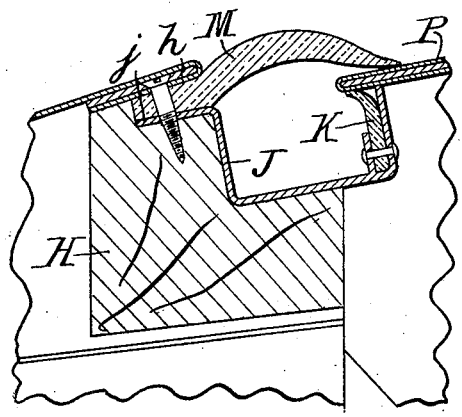

Referring next to Figures 2 and 3, H is the front cross rail of the vehicle having a rabbet at its top rear edge in which is secured a channel J having a forward flange $j$ by which it is secured to the cant rail. Against the inner surface of the rear wall of the channel is secured a rubber strip K set up on edge vertically and tapering to its upper edge. M is a rubber strip similar to the strip F of Figure 1 and clamped at or towards its forward edge to the top of the member H by a metal strip $h$. This strip M (when the roof fabric P is moved back) rests upon the top edge of the strip K, as shown in Figure 2, holding it up sufficiently high to allow the front edge of the fabric to enter beneath the rear edge of the strip M where it encounters the strip K and bends it forward, so that it no longer supports the strip M which then comes firmly down at its rear edge on to the fabric and forms a good weather joint. At the same time the strip K by springing up against the under surface of the fabric forms a good joint therewith. If, however, any water should pass the upper joint it will enter the channel J and be conducted away.

Having fully described my invention what I claim and desire to secure by Letters Patent is:—

1. A vehicle body comprising a flexible roof in the form of a cover capable of being folded back leaving longitudinal fixed rails at each side extending over the doors and windows, transverse roof members fixed to said cover and slidable in relation to said rails, a transverse rail at the forward end of the vehicle and horizontally disposed strips of resilient material each secured to the top surface of one of the rails and extending over the respective edge of said cover when the latter is set up and bearing downward thereon with light elastic pressure sufficient to secure a weather joint but not sufficient to interfere unduly with the endwise movement of the fabric, and a resilient strip set up on edge vertically in position beneath the rearward edge of the respective horizontally disposed strip serving to hold said edge of said horizontally disposed strip up sufficiently to allow the front edge of said cover to pass under it, when said front edge encounters said vertical strip bending it forward to permit said horizontally disposed strip to bear down at its rearward edge on said fabric and said strips forming each a weather joint with said cover.

2. A vehicle body comprising a roof capable of being slid back to expose the longitudinal, fixed rails at each side of the vehicle, a transverse rail at the forward end of the vehicle, a horizontally disposed strip of resilient material secured to the top surface of said transverse rail and extending over the forward edge of said roof when the latter is in its forward position and bearing downward thereon with light elastic pressure sufficient to secure a weather joint but not sufficient to interfere unduly with the endwise movement of the roof, and a strip of resilient material set up on edge vertically in position beneath the rearward edge of the horizontally disposed strip and serving to hold said edge of said horizontally disposed strip up sufficiently to allow the front edge of said roof to pass under it, when said front edge encounters said vertical strip bending it forward to permit said horizontally disposed strip to bear down at its rearward edge on said fabric and said strips each forming a weather joint with said cover.

3. A vehicle body comprising a roof capable of being slid back to expose the longitudinal, fixed rails at each side of the vehicle, a transverse rail at the forward end of the vehicle, a horizontally disposed strip of resilient material secured to the top surface of said transverse rail and extending over the forward edge of said roof when the latter is in its forward position and bearing downward thereon with light elastic pressure sufficient to secure a weather joint but not sufficient to interfere unduly with the endwise movement of the roof, a rabbet formed in the rear top edge of said transverse rail, a metal channel set in said rabbet, and a strip of resilient material set up on edge and secured to the inner side of the rearward wall of the channel in position beneath the rearward edge of the horizontally disposed strip serving to hold said edge of said horizontally disposed strip up sufficiently to allow the front edge of said roof to pass under it, when said front edge encounters said vertical strip bending it forward to permit said horizontally disposed strip to bear down at its rearward edge on said fabric and said strips forming each a weather joint with said cover.

In witness whereof I have hereunto signed my name this 17th day of July 1930.

HERBERT AUSTIN.